United States Patent [19]
Gelbard

[11] Patent Number: 5,056,745
[45] Date of Patent: Oct. 15, 1991

[54] GEARED HEAD AND METHOD FOR SELECTIVE POSITION OF A CAMERA

[75] Inventor: Richard Gelbard, Los Angeles, Calif.

[73] Assignee: Flight Research, Richmond, Va.

[21] Appl. No.: 320,005

[22] Filed: Mar. 6, 1989

[51] Int. Cl.[5] .............................................. F16M 11/00
[52] U.S. Cl. ..................................... 248/183; 248/187; 248/278; 248/286; 352/243
[58] Field of Search .............. 248/183, 187, 178, 177, 248/278, 285, 286, 184, 185, 186; 352/243

[56] References Cited

U.S. PATENT DOCUMENTS

| | | | |
|---|---|---|---|
| 1,082,053 | 12/1913 | Tessier | 248/183 |
| 1,150,304 | 8/1915 | Schneider | 248/187 X |
| 1,211,895 | 1/1917 | Theiss | 248/183 |
| 1,386,025 | 8/1921 | Pittman | 248/183 |
| 1,971,486 | 8/1934 | Jennings | 88/16 |
| 2,555,638 | 6/1951 | Fishter | 248/183 |
| 2,582,779 | 1/1952 | Hoge | 248/183 |
| 2,649,791 | 8/1953 | Braymer | 35/43 |
| 2,666,610 | 1/1954 | Norman | 248/183 |
| 3,168,003 | 2/1965 | Müller | 90/13.1 |
| 3,180,603 | 4/1965 | O'Connor | 248/183 |
| 3,205,522 | 9/1965 | Then | 248/184 X |
| 4,040,587 | 8/1977 | Gottschalk | 248/185 |
| 4,466,595 | 8/1984 | O'Connor | 248/187 X |
| 4,826,116 | 5/1989 | Blaschek et al. | 248/185 |

FOREIGN PATENT DOCUMENTS 2054405  5/1972  Fed. Rep. of Germany .
3406582  8/1985  Fed. Rep. of Germany .

Primary Examiner—David L. Talbott
Attorney, Agent, or Firm—Richard P. Matthews

[57] ABSTRACT

A geared head for a camera having a pan gearing means and a tilting means, the tilting means being mounted on the pan gearing means and having a mounting arm rotatably connected on the riser and rotatable about 360°. The camera is mounted on a mounting plate attached to the mounting arm, the height of the mounting plate being adjustable so that the center of gravity of the camera may be positioned along the axis of rotation of the mounting arm. Once the camera is balanced on the mounting plate, the camera is neutrally balanced throughout its tilt range.

17 Claims, 4 Drawing Sheets

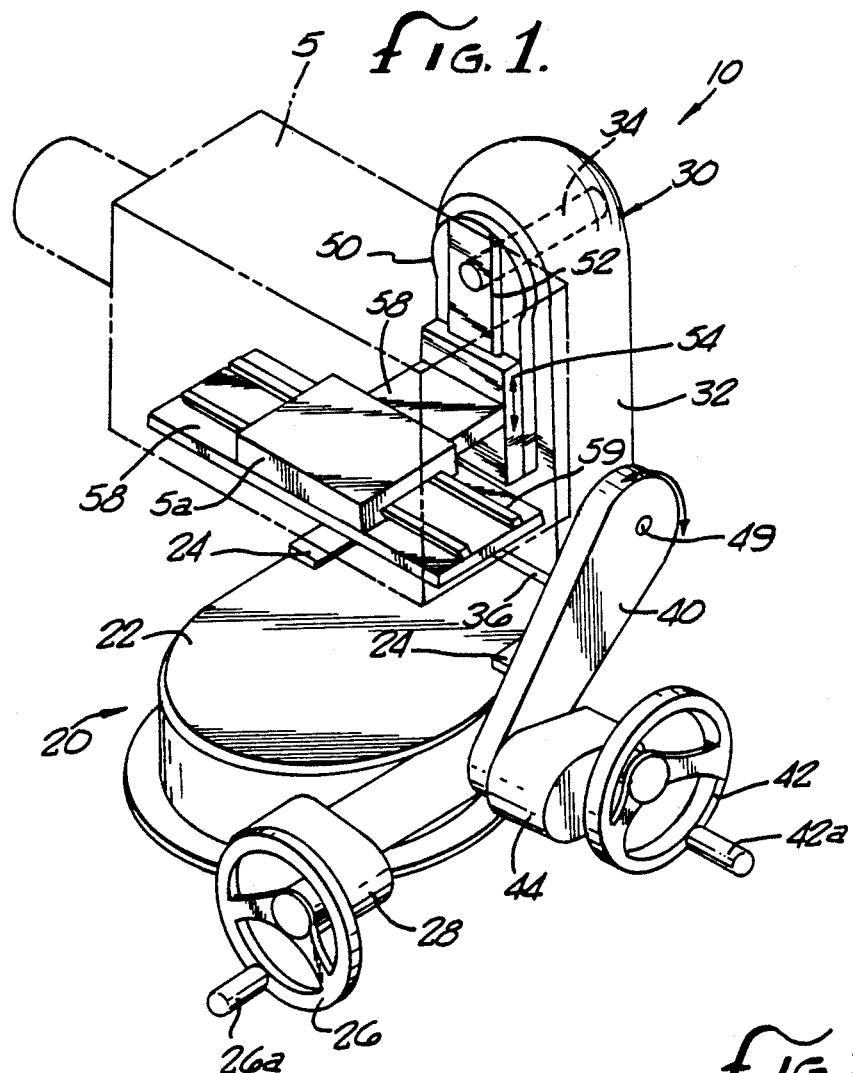
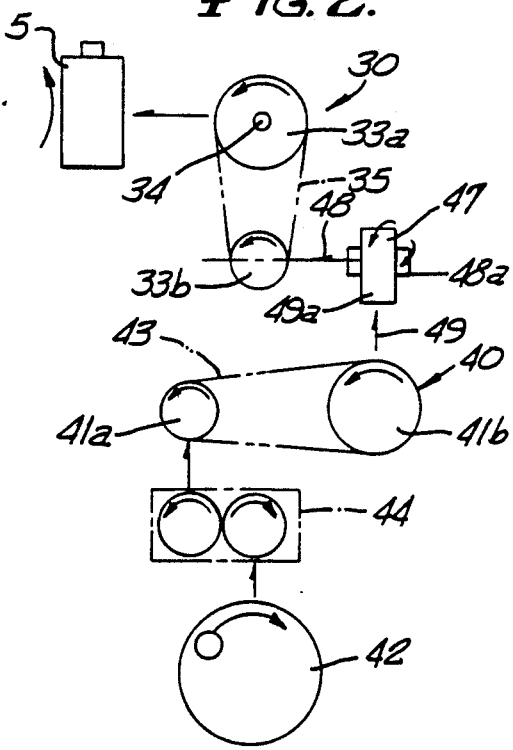

GEARED HEAD AND METHOD FOR SELECTIVE POSITION OF A CAMERA

BACKGROUND OF THE INVENTION

The present invention is directed to a geared head for a camera or a camera cradle for photographic equipment. More specifically, the present invention is directed to a mechanism for controlling the movement and the position of a camera cradle for photographic equipment. In the field of professional motion picture photography, camera cradles have been developed for allowing a change in directional elevation, i.e., tilt, in a very precise and smooth manner without removing the camera from its support base.

One such camera tilting mechanism is described in U.S. Pat. No. 4,040,587 in which the tilting mechanism employs a flexible toothed belt having its ends fixed to an arcuate undersurface of the camera cradle. The toothed belt passes around a pinion gear so that the turning of the pinion gear controls the tilting position of the camera cradle. With the camera mounted on top of the cradle, the tilting in either direction is limited to half the length of the arcuate undersurface.

The above-described tilt mechanism remains a standard in the movie industry. The pan and the tilt motions are controlled by the camera grip, i.e., the operator, operating a first crank wheel which controls the panning mechanism and a second crank wheel which controls the tilting mechanism. The crank wheels are conveniently positioned adjacent one another to provide easy manipulation.

The existing cradle tilting mechanism may also be specially adapted with alternate baseplates to accommodate and position a standard movie camera such that the center of gravity of the movie camera is placed at the center of rotation of the arcuate undersurface so that the camera remains balanced during tilting. Each different camera would require its own special baseplate in order to achieve a balanced operation.

SUMMARY OF THE INVENTION

The present invention is directed to a geared head for a camera having a pan gearing means and a tilting means, the tilting means being mounted on the pan gearing means and having a mounting arm rotatably connected on the riser and rotatable about 360°. The camera is mounted on a mounting plate attached to the mounting arm, the height of the mounting plate being adjustable so that the center of gravity of the camera may be positioned along the axis of rotation of the mounting arm. Once the camera is balanced on the mounting plate, the camera is neutrally balanced throughout its tilt range.

BRIEF DESCRIPTION OF THE DRAWINGS

FIG. 1 is a perspective diagrammatic view of a geared head according the present invention;

FIG. 2 schematically illustrates the tilting mechanism of the geared head;

FIG. 3C illustrates the camera tilted pointing upward, and FIG. 3D in a rollover position pointing in an opposite direction;

DETAILED DESCRIPTION OF A PREFERRED EMBODIMENT

Figure 3A:
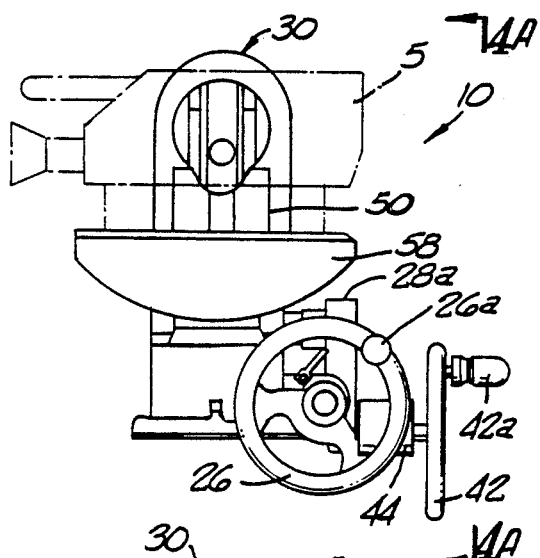
FIGS. 3A, 3B, 3C and 3D are side elevation views of the geared head of FIG. 1 illustrating four camera positions, FIG. 3A showing the camera pointing horizontally, FIG. 3B showing the camera tilted pointing downward.

The preferred embodiment will now be described with reference to the drawings. To facilitate description, any numeral representing an element in one figure will represent the same element in any other figures.

FIG. 1 illustrates a geared head 10 supporting a camera 5. The geared head 10 is comprised of a tilt assembly 30 mounted on a pan assembly 20. The pan assembly 20 is typically mounted on a tripod (not shown) or some sort of support base. The pan assembly 20 includes a cover plate 22 mounted on the top thereof. The pan assembly 20 is rotatable by a drive mechanism through a gear box 28 by operation of the pan drive crank 26. The cover plate 22 includes a female dovetail 24. The tilt assembly 30 is mounted on the plate 22 by a sliding connection between the female dovetail 24 and a corresponding male dovetail 36 on the bottom of the tilt assembly 30. Details and advantages of the sliding dovetail connection between the tilt assembly 30 and the pan assembly 20 are described below. The tilt assembly 30 includes a riser section 32 which includes the dovetail plate 36 on its bottom surface. The tilt assembly 30 operates to tilt the camera, rotating it on an axis parallel to and in a plane perpendicular to the plane of rotation of the pan assembly 20.

Figure 5:
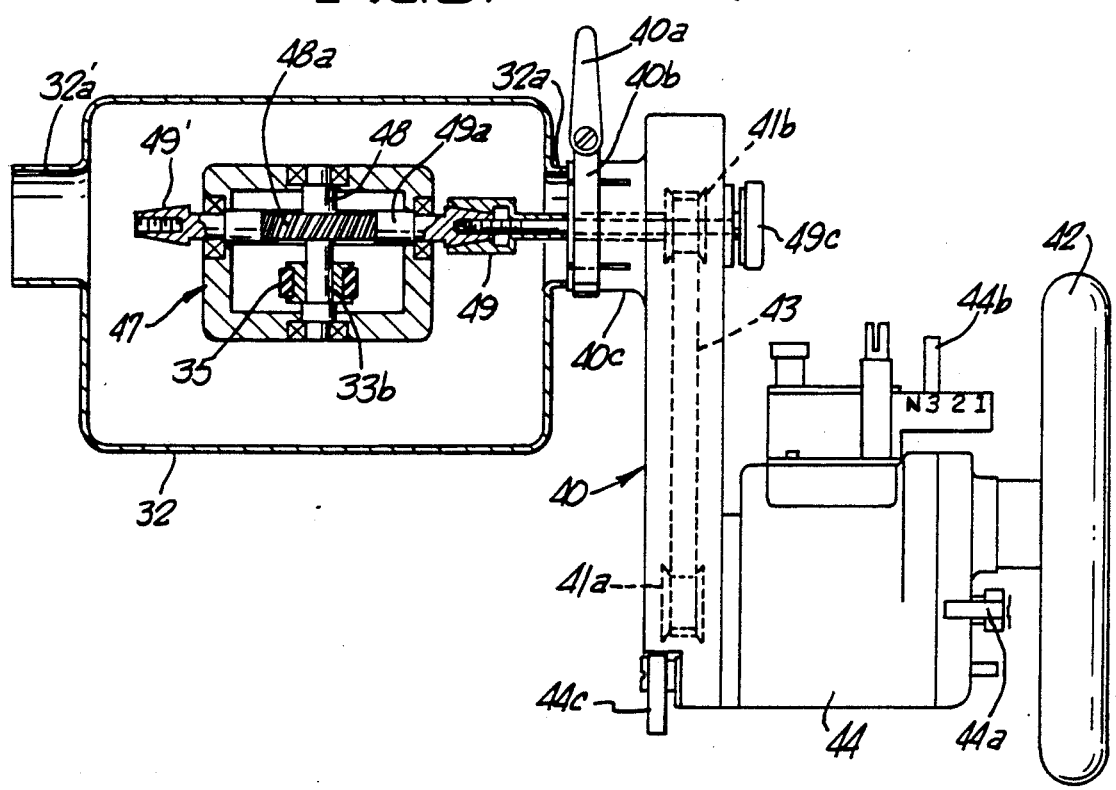
FIG. 5 is a partial cross sectional view of the geared head of FIG. 4A taken along the line 5—5.

Referring also to both FIG. 5 and the tilt assembly operational schematic of FIG. 2, a drive transmitting mechanism is shown wherein as the tilt drive crank 42 is rotated by the operator, gears within a gear box 44 rotate and in turn actuate a pulley 41a within the side drive arm 40. The pulley 41a drives a timing belt 43 which in turn rotates a corresponding pulley 41b on an opposite end of side drive arm 40. A drive gear 49a is driven by the pulley 41b through a drive shaft 49 which engages a helical driven gear 48a driving a driven shaft 48 to rotate a pulley 33b within the riser section 32. The pulley 33b rotates a second timing belt 35 which in turn drives a pulley 33a which is in an upper portion of the riser section 32. The pulley 33a in turn rotates the mounting arm shaft 34 thereby providing the tilting rotation for the mounting arm 50.

Camera 5 has a mounting plate 5a attached to its bottom surface, the camera mounting plate 5a having a dovetail connection to a mounting platform 58 supported on the mounting arm 50. The mounting arm 50 allows for sliding adjustment of the mounting platform 58 by a dovetail connection between a first mating dovetail 52 on the side of the mounting arm 50 and a second mating dovetail plate of the camera mounting plate 58. The mounting arm 50 is connected to the mounting arm shaft 34 such that the mounting arm 50 will rotate in a plane perpendicular to the axis of the mounting arm shaft 34.

FIGS. 3A, 3B, 3C and 3D are side elevation views of a geared head 10 illustrating various tilting positions for the camera 5 as the mounting arm 50 rotates with shaft 34 about the shaft axis. The camera 5 is panned by rotating the pan crank wheel 26, the crank wheel 26 having a knob 26a. The crank 26 may be locked in place by actuating the locking lever 28a. The camera 5 is tilted by rotating the tilt crank wheel 42, the crank being conveniently rotated by grasping knob 42a.

Figure 3B:
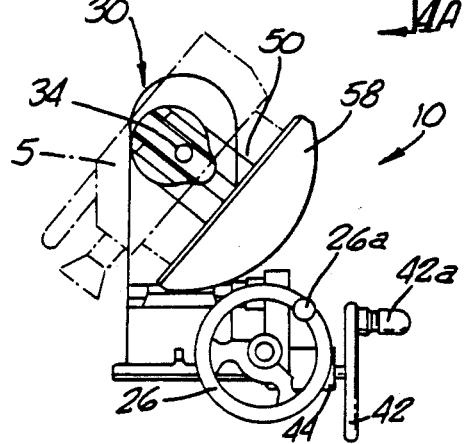
Figure 3C:
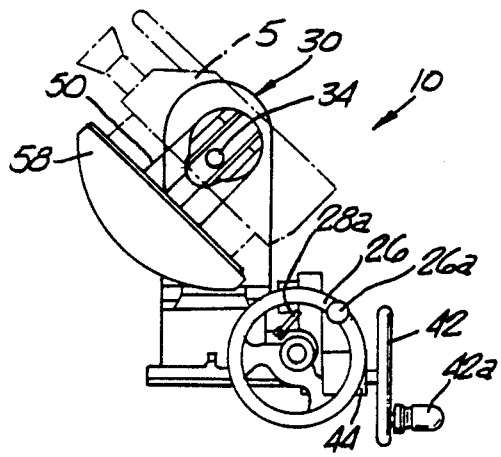
Figure 3D:
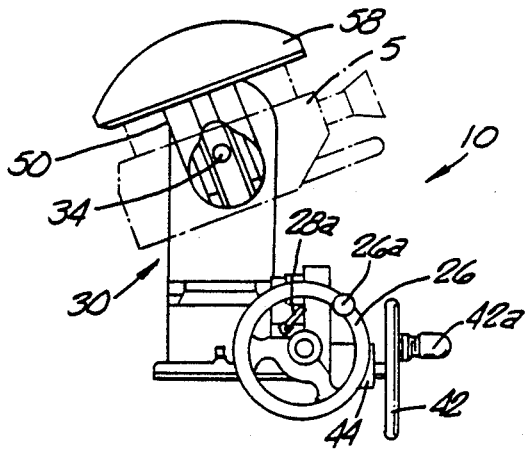

FIG. 3A illustrates the camera 5 in a horizontal orientation, FIG. 3B illustrates the camera 5 in a downward pointing direction, FIG. 3C illustrates the camera 5 in an upward pointing direction, and FIG. 3D illustrates that depending upon the clearance of the particular camera, the camera 5 may be rolled over a full 180° and if desired may be continued to be rotated to return to its horizontal position as in FIG. 3A. Descriptions of elements previously illustrated and described with respect to FIG. 1 will not be repeated.

Figure 4A:
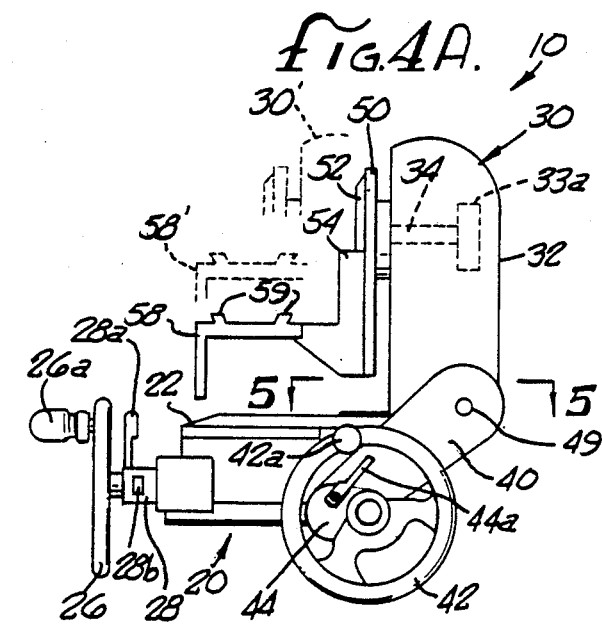
FIG. 4A is a side view of the geared head of FIG. 3A taken along the line 4A—4A.
Figure 4B:
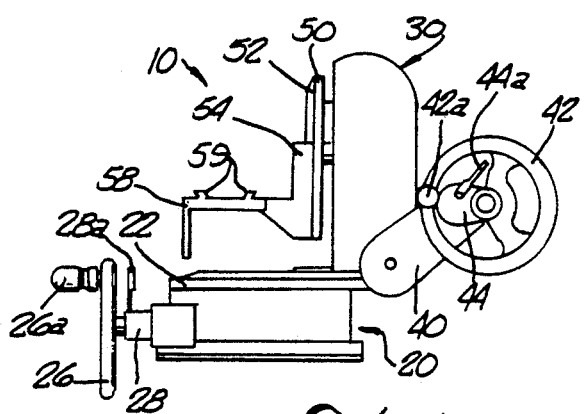
FIG. 4B is a side elevation view, similar to FIG. 4A, of the geared head with its side drive arm rotated into an alternate position.
Figure 4C:
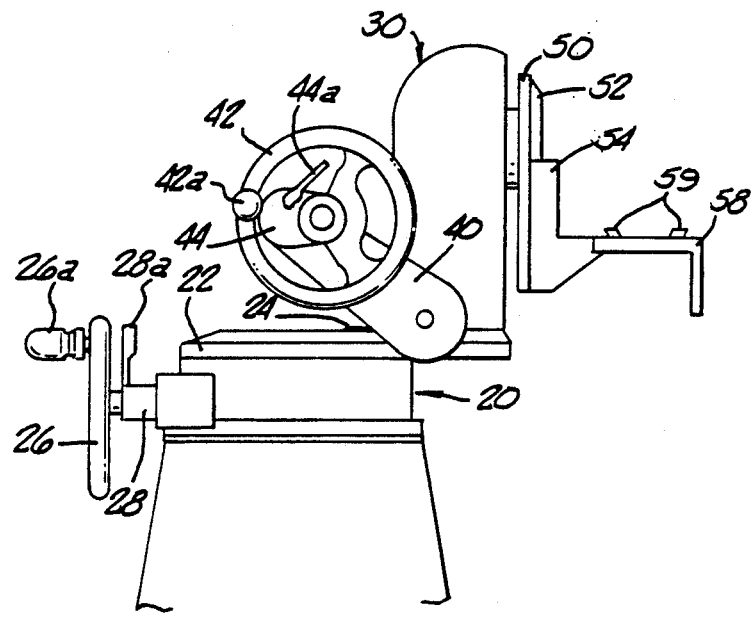
FIG. 4C is a side elevation view, similar to FIGS. 4A and 4B, of a geared head with its riser mechanism reversed into an alternate position and its tilt drive crank rotated to an alternate position.

FIG. 4A is a side elevation view of the geared head from the position shown in FIG. 3A taken along the line 4A—4A. FIG. 4B illustrates the geared head of FIG. 4A with the side drive arm 40 rotated to an alternate position. FIG. 4C also illustrates the geared head 10 as in FIG. 4A but having the tilt assembly 30 in a reversed mounting position on the pan assembly 20.

FIG. 4A best illustrates the vertical adjustment feature of the mounting plate 58 with its dovetail portion 54 sliding along a corresponding dovetail portion 52 of the mounting arm 50. The plate 58', shown in broken line, illustrates an alternate position of the plate 58 and the vertical adjustment feature of the plate 58. FIG. 4A also illustrates the dovetail portions 59 of the mounting plate 58 which mate with the dovetail mounting plate 5a attached to the camera 5 (as shown in FIG. 1).

FIG. 4A also illustrates the sliding adjustment of the tilting section 30 along the pan assembly plate 22 by the broken line illustrating an alternate position for the tilt assembly 30'. FIG. 4A further illustrates internals of the riser 32 with the driveshaft 34 connected to the mounting arm 50. The pulley 33a is positioned over the pulley 33b (see FIG. 5) which is connected to the driveshaft 49 which in turn supports the side drive arm 40.

The side drive arm 40 may be rotated throughout 360° at the option of the operator to provide desired positioning for the tilt crank wheel 42. FIG. 4B illustrates the side drive arm being rotated a full 180° from its position illustrated in FIG. 4A.

FIG. 4C illustrates the tilt assembly 30 in a reversed position from that illustrated in FIG. 4A. As previously described, the tilt assembly 30 has a base plate 36 which dovetails with corresponding dovetails 24 of the pan support plate 22. The entire tilt assembly 30 may be removed from the pan support plate 22 rotated 180° and slid back into position as shown in FIG. 4C to allow the mounting arm 50 to face in an opposite direction. With the tilt assembly 30 mounted in this reverse position, when a camera is mounted on the mounting plate 58 a complete range of rotation, a full 360°, is obtained without encountering any other head elements. A 90° downward shot may thus be achieved with this configuration. FIG. 4C also illustrates the side drive arm 40 in yet another alternate position on the opposite side of riser section 32.

FIG. 5 is a partial cross section of FIG. 4A taken along the line 5—5. The gear box 44 includes a number of gears which the operator may select by actuating the selector lever 44b in order to choose desired gear reduction. The gear reduction selections illustrated are 1, 2, 3 and N (for neutral), but the gear box 44 may be equipped with any desired gear ratio. The preferred gear reduction ratios would range from about 19:1 to a maximum of about 57:1.

Output from the gear box 44 rotates the pulley 41a which in turn drives the timing belt 43. A lock lever 44a is provided to lock the pulley 41a in place to stop any tilting motion of the camera 5. The timing belt 43 in turn drives a pulley 41b thereby driving connector shaft 49. The side drive arm 40 may be locked in place by actuating locking lever 40a on a split collar 40b encircling a split tubular extension 40c of arm 40 that is pivotally supported on a tubular stub shaft 32a on riser section 32.

The shaft 49 engages a helical driver gear 49a which in turn engages a corresponding helical driven gear 48a. The helical driven gear 48a is mounted on or part of a shaft 48 on which in turn a pulley 33b is mounted which correspondingly rotates the timing belt 35 extending up the riser section 32.

The orientation of the gearbox 44 relative to the side drive arm 40 may be adjusted by unlocking a lock lever 44c. The user may independently position the gearbox 44 after rotating the drive arm 40 so that the controls (such as gear ratio lever 44b) may be maintained horizontally or any other desired position.

FIG. 5 also illustrates that the entire drive arm 40 along with the gear box 44 and the crank 42 may be removed by disengaging cap screw 49c from hub portion 49b of the shaft portion 49a, relocating the drive arm 40 on the opposite side of the riser section 32 and the gear assembly 47 on a stub shaft 32a', and re-engaging the cap screw 49c into an alternate hub portion 49b' of the shaft portion 49a.

Figure 5A:
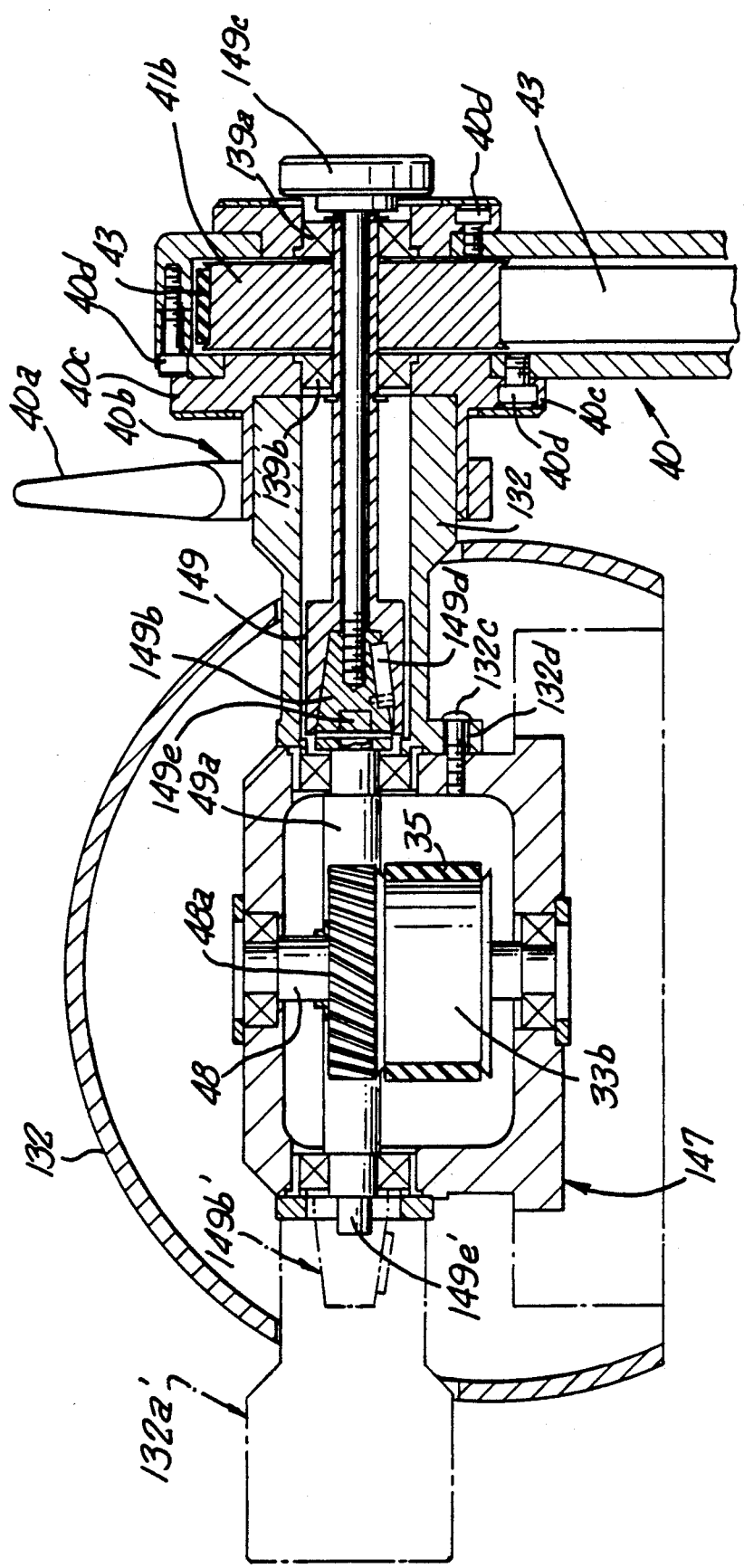
FIG. 5A is another embodiment of a portion of the tilt drive crank of FIG. 5.

FIG. 5A illustrates a preferred alternate embodiment showing the connection of the side drive arm 40 into an alternate gear assembly 147.

Similar to the previous embodiment, the timing belt 43 drives a pulley 41b which in turn drives connector shaft 149. The side drive arm 40 may be locked in place by actuating locking lever 40a on a split collar 40b encircling a split tubular extension 40c of the arm 40 that is pivotally supported on a tubular stub shaft 132a on gear assembly 147. The tubular stub shaft 132a includes a flanged portion 132b which is affixed to the gear assembly 147 such as by screws 132c. The split tubular extension 40c may be attached to the arm 40 by screws 40d.

The shaft 149 is supported on the tubular extension 40c by bearings 139a and 139b. The shaft 149 engages a helical driver gear 49a which in turn engages a corresponding helical driven gear 48a. The helical driven gear 48a is mounted on or part of a shaft 48 on which in turn a pulley 33b is mounted which correspondingly rotates the timing belt 35 extending up the riser section 132.

The orientation of the gearbox (item #44 shown in FIG. 5) relative to the side drive arm 40 may be adjusted by unlocking the lock lever 44c. The user may independently position the gearbox (item #44 shown in FIG. 5) after rotating the drive arm 40 so that the controls may be maintained horizontally or any other desired position.

A cap screw 149c passes through the center of shaft 149 and screws into hub portion 149b securing the shaft 149 thereto. FIG. 5A also illustrates that the entire drive arm 40 along with the gear box and the crank (shown in FIG. 5) may be removed by disengaging cap screw 149c from hub portion 149b of the shaft portion 49a, relocating the drive arm 40 on the opposite side of the riser section 132 and the gear assembly 147 on a stub shaft 132a', and re-engaging the cap screw 149c into an alternate hub portion 149b' of the shaft portion 49a.

The connector shaft 149 matingly engages the hub portion 149b with a key 149d therebetween. The key 149d provides a mating connection so that the hub portion 149b rotates with the connector shaft 149. The key 149d may be connected to the hub portion 149b such as by a set screw.

Though the drive connecting means described comprises flexible connector illustrated as the timing belts 35 and 43 (see FIGS. 2 and 5), other connecting means may be implemented by one skilled in the art given the description herein. Other flexible connectors may include, for example, other belt types or a chain drive. Alternately, a drive shaft may replace the timing belt 35 and/or the timing belt 43 with the drive shaft operationally connected to the other components by appropriate gearing.

The geared head 10 allows a neutral balance to be attained by the sliding dovetail connections. The dovetail connections allow adjustment of the load laterally and perpendicularly to the tilt axis thereby permitting the operator to align the camera's center of gravity with the tilt axis. The entire tilt assembly 30 being radially adjustable along the pan assembly 20 allows for alignment of the camera with the pan nodal center.

To neutrally balance the camera 5, the following steps are performed:
(1) completely lowering the camera mounting platform 58 along the dovetail 52 and locking in place;
(2) with the pan locking lever 28a and the tilt locking lever 44a in locked positions, mounting the camera 5 onto the platform 58 and locking in place;
(3) balancing the camera load laterally by unlocking the tilt locking lever 44a and adjusting the position of the camera along the platform 58 until the platform 58 returns to center after being tilted up or down and then locking the camera 5 in place once balanced; and
(4) raising the platform 58 along the vertical dovetail 52 until when the camera 5 is tilted up or down, the camera 5 maintains its position when released and then locking the dovetail 52 in place after such adjusting.

A neutrally balanced system eliminates "weight shift", the tendency of a tilted camera to return to a resting position. When neutrally balanced, a camera 5 will remain at any angle of tilt without the use of brakes or locks permitting particularly smooth starts and stops on moving shots. A secondary benefit of neutral balance is effective torque reduction which reduces the operator's effort and alleviates wear on tilt drive components.

The geared head can accommodate many different types and sizes of cameras including video cameras. The balancing system allows for adjustment to provide neutral balance for a given camera without requiring special mounting plates or other special balancing means.

Thus a geared head for a movie camera or the like has been shown and described. Though embodiments and advantages have been described, many modifications or other advantages may become obvious to those skilled in the art. The invention therefore is to be limited only in the spirit of the claims that follow.

What is claimed is:

1. A geared head for a camera, comprising a pan gearing means and a tilting means comprising:
a riser having a first end and a second end, the first end mounted upon the pan gearing means, the riser being rotatable in a first plane by the pan gearing means;
a mounting arm having one end rotatably connected to the second end of the riser so that the mounting arm rotates about 360° in a second plane perpendicular to said first plane;
a mounting plate suspended from the mounting arm;
a side drive arm having a first end and a second end, the first end being pivotally mounted to the riser such that the side drive arm is rotatably positionable in a third plane perpendicular to the first plane;
a tilt drive crank on the second end of the side drive arm; and
drive transmitting means between the tilt drive crank and the mounting arm for rotating the mounting arm with the tilt drive crank.

2. The geared head for a camera according to claim 1 wherein the mounting arm comprises a first and second mating dovetail plates which are slidably adjustable to adjust the position of the mounting plate along the mounting arm.

3. The geared head for a camera according to claim 1 wherein the drive transmitting means between the tilt drive crank and the mounting arm includes a gearbox for selectively providing a desired drive gear ratio.

4. The geared head according to claim 3 wherein the gearbox has a first end rotatably connected to the second end of the side drive arm and a second end to which the tilt drive crank is connected.

5. The geared head according to claim 4 wherein the drive transmitting means includes a connector shaft in the first end of the riser, the side drive arm being selectively mountable on either end of the connector shaft.

6. The geared head for a camera according to claim 1 wherein the riser is slidably mounted on the pan assembly, its position being radially adjustable along the pan assembly.

7. A geared head for a camera, comprising
a pan gearing means an
a tilting means comprising:
a riser having a first end and a second end, the first end mounted upon the pan gearing means, the riser being rotatable in a first plane by the pan gearing means;
a mounting arm having one end rotatably connected to the riser so that the mounting arm rotates about 360° in a second plane perpendicular to said first plane;
a mounting plate suspended from the mounting arm;
a side drive arm having a first end and a second end, the first end mounted on the riser and pivotally positionable thereon;
a tilt drive crank on the second end of the side drive arm; and
drive transmitting means between the tilt drive crank and the mounting arm for rotating the mounting arm with the tilt drive crank,
wherein the drive transmitting means between the tilt drive crank and the mounting arm includes a gearbox for selectively providing a desired drive gear ratio,
wherein the gearbox has a first end rotatably connected to the second end of the side drive arm and a second end to which the tilt drive crank is connected, and wherein the drive transmitting means comprises
a drive pulley in the second end of the side drive arm operably connected to a driven pulley in the first end of the side drive arm by a flexible connector, the drive pulley operably connected to an output shaft from the gearbox,
a connector shaft in the first end of the riser operably connected to the driven pulley of the side drive,
means connecting a drive riser pulley to the connector shaft,
a driven riser pulley mounted on a drive shaft in the second end of the riser,
a flexible connector between the drive riser pulley and the driven riser pulley,
wherein the mounting arm is mounted to the drive shaft.

8. The geared head according to claim 7 wherein the riser has an axis perpendicular to the first pan assembly and the mounting arm mounted on the drive shaft rotates about an axis of the drive shaft which is perpendicular to the riser axis.

9. A geared head for a camera, comprising
a pan gearing means and
a tilting means comprising:
a riser having a first end and a second end, the first end mounted upon the pan gearing means, the riser being rotatable in a first plane by the pan gearing means;
a mounting arm having one end rotatably connected to the second end of the riser so that the mounting arm pivots in a second plane;
a mounting plate suspended from the mounting arm;
a side drive arm having a first end and a second end, the first end being mounted to the riser;
a tilt drive crank on the second end of the side drive arm; and
drive transmitting means between the tilt drive crank and the mounting arm for rotating the mounting arm with the tilt drive crank,
wherein the riser is slidably mounted on the pan assembly, its position being radially adjustable along the pan assembly, the riser being removable from the pan assembly, rotatable 180° and replaceable thereon.

10. A titling assembly for a geared head for a camera, comprising:
a riser having an axis and a first end and a second end, the first end being mountable upon a support structure;
a mounting arm having one end rotatably connected to the riser so that the mounting arm is rotatable about 360° in a plane parallel to the axis of the riser;
means on the mounting arm for mounting the camera;
a side drive arm having a first end and a second end, the first end being pivotally mounted to the riser such that the side drive arm is rotatably positionable in a third plane perpendicular to the first plane;
a tilt drive crank on the second end of the side drive arm; and
drive transmitting means between the tilt drive crank and the mounting arm for rotating the mounting arm by operation of the tilt drive crank.

11. The geared head for a camera according to claim 10 wherein the means on the mounting arm for mounting the camera include first and second mating dovetail plates which are slidably adjustable to adjust the radial position of the camera relative to the mounting arm.

12. The geared head for a camera according to claim 10 wherein the drive transmitting means between the tilt drive crank and the mounting arm includes a gearbox for selectively providing a desired drive gear ratio.

13. The geared head for a camera according to claim 12 wherein the gearbox is rotatably mounted on the side drive arm allowing selective orientation of the gearbox relative to the side drive arm.

14. The geared head for a camera according to claim 10 wherein the riser is slidably mounted on the pan assembly, its position being radially adjustable.

15. A geared head camera tilting system, comprising
a pan gearing means and
a tilting means comprising:
a riser having a first end and a second end, the first end mounted upon the pan gearing means, the riser being rotatable in a first plane by the pan gearing means;
a mounting arm having one end rotatably connected to the second end of the riser so that the mounting arm rotates in a second plane perpendicular to said first plane;
a mounting plate suspended from the mounting arm;
a side drive arm having a first end and a second end, the first end mounted on the riser;
a tilt drive crank on the second end of the side drive arm; and
drive transmitting means between the tilt drive crank and the mounting arm for rotating the mounting arm with the tilt drive crank, the drive transmitting means including
a drive pulley in the second end of the side drive arm operably connected to a driven pulley in the first end of the side drive arm by a flexible connector, the drive pulley operably connected to the tilt drive crank,
a connector shaft in the first end of the riser operably connected to the driven pulley of the side drive,
means for connecting a drive riser pulley to the connector shaft,
a driven riser pulley mounted on a drive shaft in the second end of the riser, and
a flexible connector between the drive riser pulley and the driven riser pulley.

16. A geared head for a camera according to claim 15 wherein the flexible connector is selected from the group consisting of: a chain, a drive belt, and a timing belt.

17. A geared head for a camera according to claim 15 further comprising a camera detachably mounted on the mounting plate.

* * * * *